United States Patent
Grant et al.

(10) Patent No.: US 8,315,652 B2
(45) Date of Patent: Nov. 20, 2012

(54) HAPTICALLY ENABLED MESSAGING

(75) Inventors: Danny A. Grant, Montreal (CA); Erin B. Ramsay, Montreal (CA); Pedro Gregorio, Verdun (CA); Jason D. Fleming, San Jose, CA (US); Natasha M. Flaherty, Beltmont, CA (US)

(73) Assignee: Immersion Corporation, San Jose, CA (US)

( * ) Notice: Subject to any disclaimer, the term of this patent is extended or adjusted under 35 U.S.C. 154(b) by 397 days.

(21) Appl. No.: 11/750,694

(22) Filed: May 18, 2007

(65) Prior Publication Data
US 2008/0287147 A1 Nov. 20, 2008

(51) Int. Cl.
H04W 4/00 (2009.01)
(52) U.S. Cl. .................. 455/466; 455/412.1; 455/412.2
(58) Field of Classification Search .................. 455/466, 455/412.1, 412.2
See application file for complete search history.

(56) References Cited

U.S. PATENT DOCUMENTS

| | | | |
|---|---|---|---|
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,902,687 A | 9/1975 | Hightower | |
| 3,903,614 A | 9/1975 | Diamond et al. | |
| 4,160,508 A | 7/1979 | Salsbury et al. | |
| 4,236,325 A | 12/1980 | Hall et al. | |
| 4,513,235 A | 4/1985 | Acklam et al. | |
| 4,581,491 A | 4/1986 | Boothroyd | |
| 4,599,070 A | 7/1986 | Hladky et al. | |
| 4,708,656 A | 11/1987 | De Vries et al. | |
| 4,713,007 A | 12/1987 | Alban | |
| 4,891,764 A | 1/1990 | McIntosh | |
| 4,930,770 A | 6/1990 | Baker | |
| 4,934,694 A | 6/1990 | McIntosh | |
| 4,938,483 A | 7/1990 | Yavetz | |
| 5,019,761 A | 5/1991 | Kraft | |
| 5,022,407 A | 6/1991 | Horch et al. | |
| 5,035,242 A | 7/1991 | Franklin | |
| 5,038,089 A | 8/1991 | Szakaly | |
| 5,078,152 A | 1/1992 | Bond | |
| 5,186,695 A | 2/1993 | Mangseth et al. | |
| 5,208,745 A | 5/1993 | Quentin et al. | |
| 5,212,473 A | 5/1993 | Louis | |

(Continued)

FOREIGN PATENT DOCUMENTS
DE 20 2006 009 826 U1 9/2006
(Continued)

OTHER PUBLICATIONS
International Search Report—PCT/US2008/058584.
(Continued)

Primary Examiner — Jinsong Hu
Assistant Examiner — Michael Nguyen
(74) Attorney, Agent, or Firm — Kilpatrick Townsend & Stockton LLP (57) ABSTRACT

A mobile terminal device receives a haptically enabled message that includes text and at least one haptic feedback command. The device determines the timing of the haptic feedback command within the message. When the device receives an indication that the message is being displayed by a user, the device synchronizes a haptic effect corresponding to the haptic feedback command. The synchronizing is based on the timing and the indication.

35 Claims, 3 Drawing Sheets

U.S. PATENT DOCUMENTS

| | | |
|---|---|---|
| 5,240,417 A | 8/1993 | Smithson et al. |
| 5,271,290 A | 12/1993 | Fischer |
| 5,275,174 A | 1/1994 | Cook |
| 5,299,810 A | 4/1994 | Pierce |
| 5,309,140 A | 5/1994 | Everett |
| 5,334,027 A | 8/1994 | Wherlock |
| 5,466,213 A | 11/1995 | Hogan |
| 5,547,382 A | 8/1996 | Yamasaki |
| 5,555,894 A | 9/1996 | Doyama et al. |
| 5,629,594 A | 5/1997 | Jacobus et al. |
| 5,690,582 A | 11/1997 | Ulrich et al. |
| 5,695,400 A | 12/1997 | Fennell, Jr. et al. |
| 5,719,561 A | 2/1998 | Gonzales |
| 5,721,763 A | 2/1998 | Joseph et al. |
| 5,734,373 A | 3/1998 | Rosenberg et al. |
| 5,764,916 A | 6/1998 | Busey et al. |
| 5,766,016 A | 6/1998 | Sinclair |
| 5,785,630 A | 7/1998 | Bobick et al. |
| 5,818,836 A | 10/1998 | DuVal |
| 5,884,392 A | 12/1998 | Perach et al. |
| 5,880,731 A | 3/1999 | Liles et al. |
| 5,884,029 A | 3/1999 | Brush, II et al. |
| 5,889,670 A | 3/1999 | Schuler et al. |
| 5,907,677 A | 5/1999 | Glenn et al. |
| 5,933,599 A | 8/1999 | Nolan |
| 5,943,648 A | 8/1999 | Tel |
| 5,956,484 A | 9/1999 | Rosenberg et al. |
| 5,963,217 A | 10/1999 | Grayson et al. |
| 5,973,678 A | 10/1999 | Stewart et al. |
| 5,978,467 A | 11/1999 | Walker et al. |
| 5,983,190 A | 11/1999 | Trower et al. |
| 5,987,503 A | 11/1999 | Murakami |
| 6,028,593 A | 2/2000 | Rosenberg et al. |
| 6,046,726 A | 4/2000 | Keyson |
| 6,047,356 A | 4/2000 | Anderson |
| 6,076,100 A | 6/2000 | Cottrille et al. |
| 6,101,530 A | 8/2000 | Rosenberg et al. |
| 6,108,704 A | 8/2000 | Hutton et al. |
| 6,111,577 A | 8/2000 | Zilles et al. |
| 6,154,773 A | 11/2000 | Roberts et al. |
| 6,161,126 A | 12/2000 | Weis et al. |
| 6,166,732 A | 12/2000 | Mitchell et al. |
| 6,169,540 B1 | 1/2001 | Rosenberg et al. |
| 6,175,954 B1 | 1/2001 | Nelson et al. |
| 6,219,034 B1 | 4/2001 | Elbing et al. |
| 6,219,045 B1 | 4/2001 | Leahy et al. |
| 6,249,806 B1 | 6/2001 | Kohda et al. |
| 6,252,579 B1 | 6/2001 | Rosenberg et al. |
| 6,256,663 B1 | 7/2001 | Davis |
| 6,281,651 B1 | 8/2001 | Haanpaa et al. |
| 6,292,174 B1 | 9/2001 | Mallett et al. |
| 6,329,994 B1 | 12/2001 | Gever et al. |
| 6,339,754 B1 | 1/2002 | Flanagan et al. |
| 6,342,880 B2 | 1/2002 | Rosenberg et al. |
| 6,347,307 B1 | 2/2002 | Sandhu et al. |
| 6,349,301 B1 | 2/2002 | Mitchell et al. |
| 6,393,461 B1 | 5/2002 | Okada et al. |
| 6,396,509 B1 | 5/2002 | Cheng |
| 6,421,048 B1 | 7/2002 | Shih et al. |
| 6,422,941 B1 | 7/2002 | Thorner et al. |
| 6,425,764 B1 | 7/2002 | Lamson |
| 6,429,846 B2 | 8/2002 | Rosenberg et al. |
| 6,442,590 B1 | 8/2002 | Inala et al. |
| 6,459,892 B2 | 10/2002 | Burgan et al. |
| 6,496,200 B1 | 12/2002 | Snibble et al. |
| 6,519,771 B1 | 2/2003 | Zenith |
| 6,523,022 B1 | 2/2003 | Hobbs |
| 6,539,218 B2 | 3/2003 | Higuchi et al. |
| 6,546,390 B1 | 4/2003 | Pollack et al. |
| 6,559,845 B1 | 5/2003 | Harvill et al. |
| 6,563,487 B2 | 5/2003 | Martin et al. |
| 6,563,503 B1 | 5/2003 | Comair et al. |
| 6,630,944 B1 | 10/2003 | Kakuta et al. |
| 6,658,010 B1 | 12/2003 | Enns et al. |
| 6,677,858 B1 | 1/2004 | Faris et al. |
| 6,678,720 B1 | 1/2004 | Matsumoto et al. |
| 6,693,626 B1 | 2/2004 | Rosenberg |
| 6,711,264 B1 | 3/2004 | Matsumoto et al. |
| 6,715,045 B2 * | 3/2004 | Braun et al. ............... 711/154 |
| 6,742,116 B1 | 5/2004 | Matsui et al. |
| 6,755,743 B1 | 6/2004 | Yamashita et al. |
| 6,760,751 B1 | 7/2004 | Hachiya et al. |
| 6,763,371 B1 | 7/2004 | Jandel |
| 6,859,819 B1 | 2/2005 | Rosenberg et al. |
| 6,965,868 B1 | 11/2005 | Bednarek |
| 7,084,867 B1 | 8/2006 | Ho et al. |
| 7,149,208 B2 | 12/2006 | Mattaway et al. |
| 7,159,008 B1 | 1/2007 | Weis et al. |
| 7,222,228 B1 | 5/2007 | Stephens et al. |
| 7,359,721 B2 * | 4/2008 | Gay et al. .................. 455/466 |
| 7,706,740 B2 * | 4/2010 | Collins et al. ............. 455/3.01 |
| 2001/0044725 A1 | 11/2001 | Matsuda et al. |
| 2002/0177471 A1 * | 11/2002 | Kaaresoja et al. ........... 455/567 |
| 2002/0180698 A1 * | 12/2002 | Kaelbling ................... 345/156 |
| 2003/0064686 A1 * | 4/2003 | Thomason et al. ........... 455/90 |
| 2003/0162595 A1 * | 8/2003 | Serbanescu ................. 472/1 |
| 2004/0056840 A1 * | 3/2004 | Goldenberg et al. ......... 345/156 |
| 2004/0125120 A1 * | 7/2004 | Weiner ...................... 345/701 |
| 2005/0143102 A1 * | 6/2005 | McEvilly et al. ............. 455/466 |
| 2005/0212911 A1 * | 9/2005 | Marvit et al. ................ 348/154 |
| 2006/0129719 A1 * | 6/2006 | Cruz-Hernandez et al. .... 710/58 |
| 2006/0258378 A1 * | 11/2006 | Kaikuranata ................. 455/466 |
| 2007/0037590 A1 * | 2/2007 | Lee ........................... 455/466 |
| 2007/0057913 A1 | 3/2007 | Eid et al. |

FOREIGN PATENT DOCUMENTS

| | | |
|---|---|---|
| EP | 0 349 086 | 1/1990 |
| EP | 0 326 439 B1 | 8/1993 |
| EP | 0 655 301 B1 | 6/1998 |
| EP | 0 997 177 A2 | 5/2000 |
| GB | 2 235 310 | 2/1991 |
| GB | 2 325 766 | 12/1998 |
| GB | 2 416 962 A | 2/2006 |
| JP | H2-185278 | 7/1990 |
| JP | H4-8381 | 1/1992 |
| JP | H5-192449 | 8/1993 |
| JP | H7-24147 | 1/1995 |
| JP | 09-138767 | 5/1997 |
| JP | 10-200882 | 7/1998 |
| JP | 2001-265703 | 9/2001 |
| JP | 2003-345727 | 12/2003 |
| JP | 2004-310352 | 11/2004 |
| WO | WO 91/02313 | 2/1991 |
| WO | WO 94/25923 | 11/1994 |
| WO | WO 99/40504 | 8/1999 |
| WO | WO 00/10099 | 2/2000 |

OTHER PUBLICATIONS

Written Opinion—PCT/US2008/058584.

Adelstein, "Design and Implementation of a Force Reflecting Manipulandum for Manual Control research," DSC-vol. 42, Advances in Robotics, Edited by H. Kazerooni, pp. 1-12, 1992.

Adelstein, "A Virtual Environment System for the Study of Human Arm Tremor," Ph.D. Dissertation, Dept. of Mechanical Engineering, MIT, Jun. 1989.

Aukstakalnis et al., "Silicon Mirage: The Art and Science of Virtual Reality," ISBN 0-938151-82-7, pp. 129-180, 1992.

Baigrie, "Electric Control Loading—A Low Cost, High Performance Alternative," Proceedings, pp. 247-254, Nov. 6-8, 1990.

Bejczy et al., "A Laboratory Breadboard System for Dual-Arm Teleoperation," SOAR '89 Workshop, JSC, Houston, TX, Jul. 25-27, 1989.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, "Generalization of Bilateral Force-Reflecting Control of Manipulators," Proceedings Of Fourth CISM-IFToMM, Sep. 8-12, 1981.

Bejczy, "Sensors, Controls, and Man-Machine Interface for Advanced Teleoperation," Science, vol. 208, No. 4450, pp. 1327-1335, 1980.

Bejczy, et al., "Universal Computer Control System (UCCS) For Space Telerobots," CH2413-3/87/0000/0318501.00 1987 IEEE, 1987.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Caldwell et al., "Enhanced Tactile Feedback (Tele-Taction) Using a Multi-Functional Sensory System," 1050-4729/93, pp. 955-960, 1993.

Colgate, J. Edward, et al., "Implementation of Stiff Virtual Walls in Force-Reflecting Interfaces," Department of Mechanical Engineering, Northwestern University, Evanston, IL, Sep. 1993.

"Cyberman Technical Specification," Logitech Cyberman SWIFT Supplement, Apr. 5, 1994.

Eberhardt et al., "Including Dynamic Haptic Perception by the Hand: System Description and Some Results," DSC-vol. 55-1, Dynamic Systems and Control: vol. 1, ASME 1994.

Eberhardt et al., "OMAR—A Haptic display for speech perception by deaf and deaf-blind individuals," IEEE Virtual Reality Annual International Symposium, Seattle, WA, Sep. 18-22, 1993.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337, 1989.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bulletin, "Mouse Ball-Actuating Device With Force and Tactile Feedback," vol. 32, No. 9B, Feb. 1990.

Hinckley,K., "Haptic Issues for Virtual Manipulation," Dissertation for PHD at the University of Virginia, pp. 1-200, Dec. 1996.

Iwata, "Pen-based Haptic Virtual Environment," 0-7803-1363-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies, May 1995.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Marcus, "Touch Feedback in Surgery," Proceedings of Virtual Reality and Medicine the Cutting Edge, Sep. 8-11, 1994.

McAffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Pimentel et al., "Virtual Reality: through the new looking glass," 2nd Edition; McGraw-Hill, ISBN 0-07-050167-X, pp. 41-202, 1994.

Rabinowitz et al., "Multidimensional tactile displays: Identification of vibratory intensity, frequency, and contactor area," Journal of the Acoustical Society of America, vol. 82, No. 4, Oct. 1987.

Russo, "Controlling Dissipative Magnetic Particle Brakes in Force Reflective Devices," DSC-vol. 42, Advances in Robotics, pp. 63-70, ASME 1992.

Russo, "The Design and Implementation of a Three Degree of Freedom Force Output Joystick," MIT Libraries Archives Aug. 14, 1990, pp. 1-131, May 1990.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Terry et al., "Tactile Feedback in a Computer Mouse," Proceedings of Fourteenth Annual Northeast Bioengineering Conference, University of New Hampshire, Mar. 10-11, 1988.

Yamakita et al., "Tele-Virtual reality of Dynamic Mechanical Model," Proceedings of the 1992 IEEE/RSJ International Conference on Intelligent Robots and Systems, Raleigh, NC, Jul. 7-10, 1992.

1998 IEEE International Conference on robotics and Automation, web page at www.wings.buffalo.edu/academic/department/eng/mae/ieee/icra98/ABST.html as available via the Internet.

Curry, "Supporting Collaborative Interaction in Tele-Immersion," 1998, web page at www.sv.vt.edu/future/cave/pub/curryMS/CurryMS.html as available via the Internet.

Hansen, "Enhancing Documents with Embedded Programs: How Ness Extends Insets in the Andrew Toolkit," Computer Languages, 1990, IEEE.

Hayward et al., "Parameter Sensitivity Analysis for Design and Control of Force Transmission Systems," 1995, web page at www.cim.mcgill.ca/~haptic/pub/MC.trans.ps.gz, as available via the Internet.

Jones et al., "NSF Workshop on Human-Centered Systems: Breakout Group 2—Communication and Collaboration," web page at www.ifp.uiuc.edu/nsfhcs/bog_reports/bog2.html, as available via the Internet and printed Mar. 1, 2005.

MacLean, "Designing with Haptic Feedback," 2000, web page at www.cs.ubc.ca/nest/lci/papers/2000/maclean-icra00-DesignWith-Haptic-reprint.pdf, as available via the internet.

Mania et al., "A Classification for User Embodiment in Collaborative Virtual Environments (extended version)," web page at www.cs.bris.ac.uk/~mania/paper1.htm, as available via the Internet.

Mine, "Virtual Environment Interaction Techniques," 1995, web page at ftp.cs.unc.edu/pub/technical-reports/95-018.ps.Z, as available via the Internet.

Mine, "ISAAC: A Virtual Environment Tool for the Interactive," 1995, web page at ftp.cs.unc.edu/pub/technical-reports/95-020.ps.Z, as available via the Internet.

Picinbono et al., "Extrapolation: A Solution for Force Feedback?" Virtual Reality and Prototyping, 1999, web page at www-sop.inria.fr/epidaure/AISIM/CompteRendu/aisim3/picinobo.pdf, as available via the Internet.

Ruspini et al., "The Haptic Display of Complex Graphical Environments," 1997, Computer Graphics Proceedings, Annual Conference Series, www.robotics.stanford.edu/people/krasi/Siggraph97.ps.Z, as available via the Internet.

Thompson, II et al., "maneuverable Nurbs Models within A Haptic Virtual Environment," web page available at www.cs.utah.edu/gdc/publications/papers/thompson97b.ps.Z, as available via the Internet.

Wloka, "Interacting with Virtual Reality," 1995, web page at wilma.cs.brown.edu/research/graphics/research/pub/papers/coimbra.ps, as available via the Internet.

ATIP98.059, Virtual Reality (VR) Development at SERI (Korea), 1998, web page at www.atip.org/public/atip.reports.98.059r.html, as available via the Internet.

McLaughlin et al., "The USC Interactive Art Museum: Removing the Barriers between Museums and their Constituencies," web page at http://ascusc.org/jcmc/paperforica.html, as available via the Internet.

Bouguila, et al., "Effect of Coupling Haptics and Stereopsis on Depth," web page at www.dcs.gla.ac.uk/~stephen/workshops/haptic/papers/bougilia-paper.pdf, as available via the Internet.

Pao et al., "Synergistic Visual/Haptic Computer Interfaces," 1998, Hanoi, Vietnam, web page at schof.colorado.edu/~pao/anonftp/vietnam.ps, as available via the Internet.

eRENA, Deliverable 7b.1, Pushing Mixed Reality Boundaries, 1999, web page at www.nada.kth.se/erena/pdf/D7b_1.pdf, as available via the Internet.

Real Time Graphics, Green Bar-Full Page EPS, Aug. 1998, web page at www.cgsd.com/rtgAug98.pdf as Available via the Internet.

United States Patent and Trademark Office, Office Action, U.S. Appl. No. 11/545,739, mailed Oct. 22, 2007.

United States Patent and Trademark Office, Office Action, U.S. Appl. No. 11/545,739, mailed Mar. 5, 2008.

United States Patent and Trademark Office, Office Action, U.S. Appl. No. 09/608,129, mailed Sep. 24, 2003.

United States Patent and Trademark Office, Office Action, U.S. Appl. No. 09/608,129, mailed Mar. 19, 2004.

United States Patent and Trademark Office, Office Action, U.S. Appl. No. 09/608,129, mailed Aug. 10, 2004.

United States Patent and Trademark Office, Office Action, U.S. Appl. No. 09/608,129, mailed Mar. 15, 2005.

United States Patent and Trademark Office, Office Action, U.S. Appl. No. 09/608,129, mailed Nov. 28, 2005.

State Intellectual Office of the Peoples Republic of China, First Office Action, Application No. 200810083652, dated Dec. 15, 2009.

State Intellectual Office of the Peoples Republic of China, Second Office Action, Application No. 200810083652, dated Jul. 30, 2010.

European Patent Office, Communication Pursuant to 94(3) EPC, Application No. 01995050, dated May 25, 2009.

European Patent Office, European Supplemental Search Report, Application No. 01995050, dated Mar. 18, 2009.

State Intellectual Office of the Peoples Republic of China, Notification of the First Office Action, Application No. 01810866, dated Apr. 2, 2004.

Japanese Patent Office, Notification of Reasons for refusal, Application No. 2002-508173, dated Jun. 14, 2010.

Japanese Patent Office, Decision of Refusal, Application No. 2002-508173, dated Dec. 9, 2010.

Office Action in EP 08744547.4 mailed May 5, 2010.

European Patent Office, Communication pursuant to Article 94(3) EPC, Application No. 08 744 547, dated Dec. 9, 2010.

European Patent Office, Communication Pursuant to 94(4) EPC, Application No. 08744547, dated Aug. 11, 2011.

Japanese Patent Office, Notification of Reasons for Refusal, Application No. 2010-260419, dated Oct. 27, 2011.

Japanese Patent Office, Notice of Reasons for Rejection, Application No. 2010-509412, dated Jun. 20, 2012.

* cited by examiner

HAPTICALLY ENABLED MESSAGING

FIELD OF THE INVENTION

One embodiment is directed to electronic messaging. More particularly, one embodiment is directed to haptically enabled electronic messaging for mobile terminal devices.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, referred to as "handheld devices" or "mobile terminal devices", such as cellular telephones, personal digital assistants ("PDA"s), smart phones, and portable gaming devices. For example, some portable gaming applications are capable of vibrating in a manner similar to control devices (e.g., joysticks, etc.) used with larger-scale gaming systems that are configured to provide haptic feedback. Additionally, devices such as cellular telephones and PDAs are capable of providing various alerts to users by way of vibrations. For example, a cellular telephone can alert a user to an incoming telephone call by vibrating. Similarly, a PDA can alert a user to a scheduled calendar item or provide a user with a reminder for a "to do" list item or calendar appointment.

Many mobile terminal devices, in addition to handling voice telephone calls, allow for messaging between devices. Short Message Service ("SMS"), also known as text messaging, is a popular communication method that enables the exchange of short text messages between mobile terminal devices via the Short Message Service Centre ("SMSC") in a mobile network. Other known messaging methods for mobile terminal devices include Multimedia Messaging Service ("MMS"), Mobile Instant Messaging, and Mobile Email. MMS is a store and forward messaging service that allows mobile subscribers to exchange multimedia messages with other mobile subscribers. As such, it can be seen as an evolution of SMS, with MMS supporting the transmission of additional media types, including text, picture, audio, video, or a combination of all four. Instant Messaging ("IM") is an Internet Protocol ("IP") based application that can provide real-time written communication between users of a computer. Mobile Instant Messaging is the ability to engage in Instant Messaging services from a mobile handset. Mobile IM allows users to address messages to other users using an alias (or user name) and address book, and incorporates the concept of presence, enabling the sender to know when his/her "buddies" are available. Mobile E-mail is the ability to send and receive e-mail over wireless devices.

Haptic feedback can be used to provide additional information that may not be apparent in the text of the message to the recipient of a message. For example, a text message sent to another user at a mobile terminal device may not include information indicating how strong the user feels about the topic expressed or other message subtext. Users can try to express this subtext using well-known icons or symbols known as "emoticons," which are culturally dependent iconic representations of emotions or messages. For example, a "smiley" emoticon to indicate a humorous message may be expressed as a colon and right parenthesis mark, ":)", which resembles a face smiling when viewed from the side, or may also be expressed as a combination of parenthesis, carets, and an underline "(^^)". Variations of the smiley emoticon can express a variety of other emotions. However, emoticons and symbols are limited in the complexity of the messages they can convey.

SUMMARY OF THE INVENTION

One embodiment of the present invention is a mobile terminal device that receives a haptically enabled message that includes text and at least one haptic feedback command. The device determines the timing of the haptic feedback command within the message. When the device receives an indication that the message is being displayed by a user, the device synchronizes a haptic effect corresponding to the haptic feedback command. The synchronizing is based on the timing and the indication.

DETAILED DESCRIPTION

One embodiment is a mobile terminal device that can generate and receive haptically enabled messages. When a user reads the message, the haptic content of the message is synchronized with the textual content to enhance the effectiveness of the message.

Haptic feedback embedded in messages, in contrast to emoticons, can offer much more complex and direct ways to express subtext to other users in a more effective manner. Haptic feedback can be used to emphasize information that is contained in the text of the message to the recipient of a message. For example, a text message sent to a user at a mobile terminal device may indicate that gasoline prices are about to rise in their area by a certain amount of money. Haptic feedback embedded in the message can convey to the user the amount of the price differential, enabling the user to understand the meaning of the message without reading the text.

Figure 1:
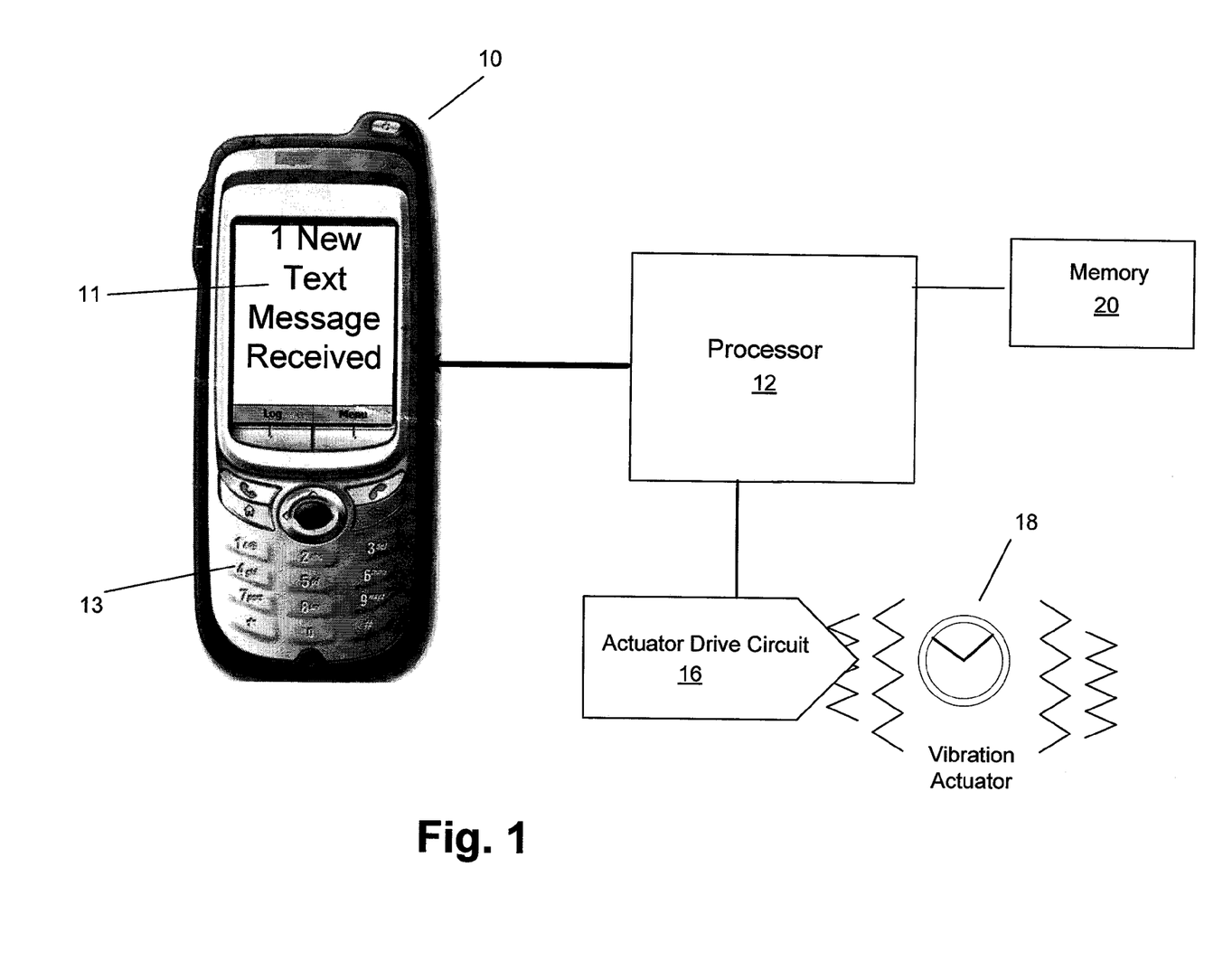
FIG. 1 is a block diagram of a cellular telephone in accordance with one embodiment.

FIG. 1 is a block diagram of a cellular telephone 10 in accordance with one embodiment. Telephone 10 includes a screen 11 and keys 13. In one embodiment, keys 13 are mechanical type keys. In another embodiment, keys 13 can be implemented by a touchscreen so that keys 13 are touchscreen keys, or can be implemented using any method. Internal to telephone 10 is a haptic feedback system that generates vibrations or other types of haptic feedback on telephone 10. In one embodiment, the vibrations are generated on the entire telephone 10. In other embodiments, specific portions of telephone 10 can be haptically enabled by the haptic feedback system, including individual keys of keys 13, whether the keys are mechanically oriented, touchscreen, or some other type of implementation.

The haptic feedback system includes a processor 12. Coupled to processor 12 is a memory 20 and an actuator drive circuit 16, which is coupled to a vibration actuator 18. Although the embodiment of FIG. 1 is a cellular telephone, embodiments of the present invention can be implemented with any type of mobile terminal device, or any device that uses an actuator to generate vibrations or that generates other types of haptic feedback.

Processor 12 may be any type of general purpose controller or processor, or could be a processor specifically designed to provide haptic effects, such as an application-specific integrated circuit ("ASIC"). Processor 12 may be the same controller/processor that operates the entire telephone 10, or may be a separate processor. Processor 12 can decide what haptic effects are to be played and the order in which the effects are played based on high level parameters. In general, the high level parameters that define a particular haptic effect include magnitude, frequency and duration.

Processor 12 outputs the control signals to drive circuit 16 which includes electronic components and circuitry used to supply actuator 18 with the required electrical current and voltage to cause the desired haptic effects. Actuator 18 is a haptic device that generates a vibration on telephone 10. Actuator 18 can include one or more force applying mechanisms which are capable of applying a vibrotactile force to a user of telephone 10 (e.g., via the housing of telephone 10). Actuator 18 may be, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys. Memory 20 can be any type of storage device, such as random access memory ("RAM") or read-only memory ("ROM"). Memory 20 stores instructions executed by processor 12. Memory 20 may also be located internal to processor 12, or any combination of internal and external memory. In one embodiment, the haptic feedback system may further include an accelerometer (not shown) that measures the acceleration of telephone 10.

Memory 20 further stores instructions that when executed by processor 12 allow a user at telephone 10 to create haptically enabled messages that include haptic content, and to read received haptically enabled messages so that the haptic content is synchronized with the textual content of the messages. In one embodiment, a mobile browser is used to create and read haptically enabled messages.

In one embodiment, a user will create a haptically enabled message on telephone 10 by selecting from a list of icons, commands, codes, emoticon, etc. (collectively, "haptic feedback commands") for designating a haptic feedback. Each haptic feedback may be mapped to specific haptic code that when executed by processor 12 causes the haptic feedback system to generate the specified haptic feedback effect.

For example, a smiley icon, emoticon or command (e.g., :), ☺, (^^), or <smiley>) can be selected by the user and inserted within the text of an SMS message. The haptic feedback command, when received by the recipient, will create the mapped haptic feedback effect at the user's mobile terminal device. The haptic feedback effect will be related to the type of haptic command. For example, a "pat" effect may generate haptic feedback implementing a small, smooth jolt to the grip or user object of the recipient user's mobile termination device, like a pat of a hand. The "giggle" effect may provide a low-frequency vibration, the "slap" effect may provide a sharp, high magnitude jolt, and the "smile" effect may provide a slow side-to-side motion, etc.

In one embodiment, the user can insert haptic content into the message or pre-assign specific key words, phrases or emoticons with haptic effects. Groups of emoticons can also be tagged and a single haptic effect attached to them. For example all emoticons associated with "happy" sentiments can be assigned to the same category and have the same haptic effect. In one embodiment, haptic effects can be default assigned to emoticons, key words of phrases. In another embodiment, an invisible command can be inserted in the message so the recipient will not be able to visually anticipate a haptic effect when the message is read.

In one embodiment, telephone 10 allows the user to feel the haptic effect as they are entering the text. In this embodiment, as the user is authoring the message, the haptic feedback can be played back on the device in order for the sender to know what haptic effect is being sent.

Figure 2:
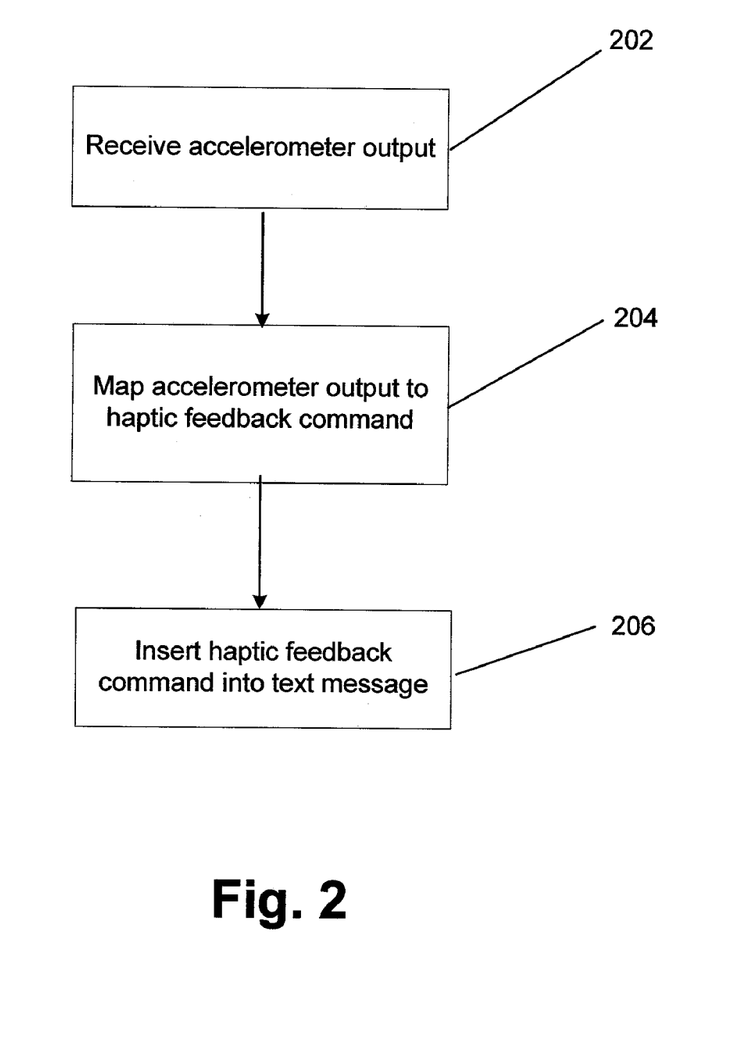
FIG. 2 is a flow diagram of the functionality of a telephone in accordance with one embodiment when gestures are used to create a haptically enabled message.

One embodiment uses gestures to create haptically enabled messages. FIG. 2 is a flow diagram of the functionality of telephone 10 in accordance with one embodiment when gestures are used to create a haptically enabled message. In one embodiment, the functionality of the flow diagram of FIG. 2, and other flow diagrams disclosed below, is implemented by software stored in memory and executed by a processor. In other embodiments, the functionality can be performed by hardware, or any combination of hardware and software.

While inputting text for purposes of creating a message, a user may input a haptic effect through gestures by, for example, moving telephone 10 in a certain fashion that is then mapped to a haptic effect. For example, if the user wishes to express contentment with a message the telephone could be gently rocked back and forth. At 202, the rocking generates an accelerometer output. At 204, processor 12 receives the accelerometer output and maps it to a predetermined haptic effect and corresponding haptic feedback command. For example, the gentle rocking, which would generate relatively low frequency low magnitude accelerations, could be mapped to a smooth low frequency haptic effect. If the user were angry the phone could be shaken up and down with a fast motion, which could be mapped to a haptic effect that is of high intensity and high frequency. At 206, processor 12 inserts the haptic feedback command that corresponds to the haptic effect and inserts it into the text message at the appropriate portion (e.g., at the point of the text message that corresponds to when the user initiated the gesture).

In another embodiment, the haptically enabled message can be generated using voice recognition software. The voice recognition software can tie voice commands to user generated haptic effects. Various aspects of the voice input can be used to map haptic effects such as word commands (e.g., strong, short, short), voice emphasis (e.g., tone of voice) or noises created by the user such as jazz-scat or beat boxing. In another embodiment, gestures can be generated through a video camera input or an input of a user's interface with a touchscreen.

When a user at telephone 10 receives a message, an alert that a new message has been received will typically be displayed to the user on, for example, screen 11. The user will then select the desired message to view. In one embodiment, where the message is a haptically enabled message, there is a need for the playing or initiation of the haptic content to be synchronized or correspond to the textual content of the message.

In another embodiment, haptic content is played when the new message alert is received. The haptic alert can indicate the nature of the content of the message, for example the haptic feedback command contained in the message. Or the haptic alert can identify the message sender or the urgency of the message. In such case the style of the haptic alert may be user configurable.

Figure 3:
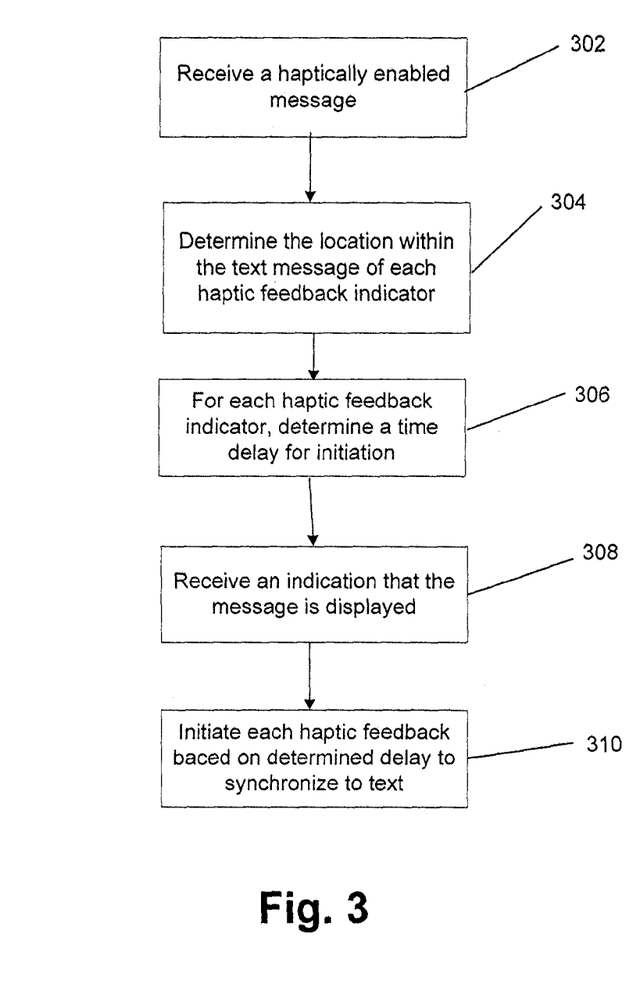
FIG. 3 is a flow diagram of the functionality of a telephone in order to synchronize the haptic content of a haptically enabled message with the textual content in accordance with one embodiment.

FIG. 3 is a flow diagram of the functionality of telephone 10 in order to synchronize the haptic content of a haptically enabled message with the textual content in accordance with one embodiment. At 302, the haptically enabled message is received at telephone 10. In one embodiment, the message may have been initially received without haptic effects and the haptic effects are subsequently inserted in the message. An indication is displayed to the user that a new message is available. At 304, the location of each haptic feedback command within the text message is determined. The location can be based, for example, on the length of the text by word or character count of some other determination.

At 306, for each haptic feedback command and based on the location determined at 304, a time delay for initiating the corresponding haptic effect is determined. The time delay may be a delay from the time that the message is opened by the user.

At 308, when the user opens the message or otherwise accesses the message so it can be read on telephone 10, an indication is received that the message has been opened by the user. At 310, each haptic feedback is initiated based on the determined time delay which is the delay from the time that the message was opened by the user. Therefore, each haptic content is synchronized to the textual content.

For example, the haptically enabled message may include the following:

I went to the store to get ice cream, because I like ice cream ☺, but I was disappointed because they were sold out! ☹

Where the smiley and sad icons are associated with haptic feedback commands. Based on the functionality of FIG. 3, the haptic feedback corresponding to ☺ would first be initiated after an initial pause based on the number of characters or words before the ☺ and then the haptic feedback corresponding to the ☹ would be initiated after an initial pause based on the number of characters or words before the ☹ and after the ☺. In other embodiments, some characters would be given more or less amount of pause time, and some other portions of the message may be given consideration in determining the amount of pause time, such as the amount of spaces or new lines Other embodiments use criteria other than text length and the location of the haptic feedback command within the text in order to synchronize the haptic content with text content. In one embodiment, a determination of when the user or the device is scrolling the text or otherwise advancing the text can be used as a cue for initiating haptic feedback. In another embodiment, an estimate of the user's reading speed can be used to time haptic feedback initiation. A user's reading speed may be measured to obtain this estimate and use that for the timing of the haptic feedback content. For example a user could read one or two test messages and press a button when complete.

In an embodiment where the text includes multimedia content, such as audio and video in an MMS message, the haptic feedback initiation can be coordinated with the timing of the multimedia events.

In a message that includes a high number of haptic feedback commands, one embodiment establishes a precedence order for haptic effects or may even triage effects. For example, if many emoticons were in succession in the text, a decision could be made as to which emoticon would result in haptic effects and which would be ignored.

In one embodiment, haptic effects in haptically enabled messages can be automatically generated when the message is composed. The text of the message can be parsed and the appropriate haptic effect and corresponding haptic feedback command can be automatically inserted. The appropriate haptic effect can be based on, for example, words, phrases, emoticons, punctuation, or the inferred context on the message.

Several embodiments disclosed are specifically illustrated and/or described herein. However, it will be appreciated that modifications and variations are covered by the above teachings and within the purview of the appended claims without departing from the spirit and intended scope of the invention.

For example, some embodiments disclosed above are implemented in a cellular telephone, which is an object that can be grasped, gripped or otherwise physically contacted and manipulated by a user. As such, the present invention can be employed on other haptics enabled input and/or output devices that can be similarly manipulated by the user. Such other devices can include a touch screen (Global Positioning System ("GPS") navigator screen on an automobile, an automated teller machine ("ATM") display screen), a remote for controlling electronics equipment (audio/video, garage door, home security, etc.) and a gaming controller (joystick, mouse, specialized controller, gamepad, etc.). The operation of such input and/or output devices is well known to those skilled in the art. Further, embodiments can be implemented on non-mobile terminal devices that are capable of generating haptic effects that can be sensed by a user.

What is claimed is:

1. A method of operating a mobile terminal device comprising:
    accessing a haptically enabled message, the message comprising text and a plurality of haptic feedback commands, wherein at least two haptic feedback commands of the plurality of haptic feedback commands occur in succession within the message;
    determining a timing of each haptic feedback command of the plurality of haptic feedback commands within the message;
    assigning a precedence order to the at least two haptic feedback commands;
    receiving an indication that the message is being displayed on said mobile terminal device; and
    synchronizing the initiation of a plurality of haptic effects corresponding to fewer than all of the plurality of haptic feedback commands based on the received indication, the assigned precedence order, and the determined timing associated with the plurality of haptic feedback commands,
    wherein the synchronizing comprises:
    determining a time delay for each haptic feedback command based on the timing; and
    initiating a haptic effect corresponding to each haptic feedback command after an expiration of the corresponding time delay upon receiving the indication.

2. The method of claim 1, wherein the determination of timing of each haptic feedback command is based on a location of the haptic feedback command within the message.

3. The method of claim 2, wherein the location is based on a word count of the text.

4. The method of claim 2, wherein the location is based on a character count of the text.

5. The method of claim 2, wherein the location is based on a reading speed of a user of the device.

6. The method of claim 1, further comprising:
prior to accessing, generating the haptically enabled message by receiving a gesture from a user of the device and converting the gesture into at least one haptic feedback command in the haptically enabled message.

7. The method of claim 6, wherein the gesture is a movement of the device by the user.

8. The method of claim 6, wherein the gesture is a video of the user.

9. The method of claim 1, wherein at least one haptic feedback command of the plurality of haptic feedback commands is an emoticon.

10. The method of claim 1, wherein at least one haptic feedback command of the plurality of haptic feedback commands is not visible in the message.

11. The method of claim 1, further comprising:
generating a haptic effect separate from the plurality of haptic effects in conjunction with a receipt of the haptically enabled message at the device.

12. The method of claim 11, wherein said haptic effect separate from the plurality of haptic effects may indicate at least one of message content, sender and priority.

13. A mobile terminal device comprising:
a processor;
a memory coupled to the processor; and
an actuator coupled to the processor;
wherein the processor is configured to access a haptically enabled message, the message comprising text and a plurality of haptic feedback commands, wherein at least two haptic feedback commands of the plurality of haptic feedback commands occur in succession within the message, and wherein the processor is further configured to:
determine a timing of each haptic feedback command of the plurality of haptic feedback commands within the message;
assign a precedence order to the at least two haptic feedback commands;
receive an indication that the message is being displayed on said mobile terminal device; and
synchronize the initiation of a plurality of haptic effects corresponding to fewer than all of the plurality of haptic feedback commands based on the received indication, the determined timing associated with the plurality of haptic feedback commands, and the assigned precedence order,
wherein synchronizing the initiation of the plurality of haptic effects comprises:
determining a time delay for each haptic feedback command based on the timing; and
initiating a haptic effect corresponding to each haptic feedback command after an expiration of the corresponding time delay upon receiving the indication.

14. The mobile terminal device of claim 13, wherein the plurality of haptic effects are generated by the actuator.

15. The mobile terminal device of claim 13, wherein the determination of timing of each haptic feedback command is based on a location of the haptic feedback command within the message.

16. The mobile terminal device of claim 15, wherein the location is based on a word count of the text.

17. The mobile terminal device of claim 15, wherein the location is based on a character count of the text.

18. The mobile terminal device of claim 15, wherein the location is based on a reading speed of a user of the device.

19. The mobile terminal device of claim 13, wherein the processor is further configured to:
prior to accessing, generate the haptically enabled message by receiving a gesture from a user of the device and converting the gesture into at least one haptic feedback command in the haptically enabled message.

20. The mobile terminal device of claim 19, further comprising an accelerometer coupled to the processor, wherein the gesture is a movement of the device by the user.

21. The mobile terminal device of claim 19, wherein the gesture is a video of the user.

22. The mobile terminal device of claim 13, wherein at least one haptic feedback command of the plurality of haptic feedback commands is an emoticon.

23. The mobile terminal device of claim 13, wherein at least one haptic feedback command of the plurality of haptic feedback commands is not visible in the message.

24. A non-transitory computer readable storage medium having instructions stored thereon that, when executed by a processor, cause the processor to:
determine a timing of each haptic feedback command within a haptically enabled message, the message comprising text and a plurality of haptic feedback commands, wherein at least two haptic feedback commands of the plurality of haptic feedback commands occur in succession within the message;
assign a precedence order to the at least two haptic feedback commands;
receive an indication that the message is being displayed on said mobile terminal device; and
synchronize the initiation of a plurality of haptic effects corresponding to fewer than all of the plurality of haptic feedback commands based on the received indication, the determined timing associated with the plurality of haptic feedback commands, and the assigned precedence order,
wherein the synchronizing comprises:
determining a time delay for each haptic feedback command based on the timing; and
initiating a haptic effect corresponding to each haptic feedback command after an expiration of the corresponding time delay upon receiving the indication.

25. The non-transitory computer readable storage medium of claim 24, wherein the determination of timing for each haptic feedback command is based on a location of the haptic feedback command within the message.

26. The non-transitory computer readable storage medium of claim 25, wherein the location is based on a word count of the text.

27. The non-transitory computer readable storage medium of claim 25, wherein the location is based on a character count of the text.

28. The non-transitory computer readable storage medium of claim 25, wherein the location is based on a reading speed of a user of the device.

29. The method of claim 1, wherein at least one of the haptic effects is a function of the inferred context of the text of the message.

30. The method of claim 5, further comprising:
presenting the user of the device with one or more test message to read; and
estimating the reading speed of the user based on the user's reading of the one or more test messages.

31. The method of claim 1, further comprising:
determining whether the text is being scrolled, wherein said determination provides a cue for initiating at least one of the haptic effects.

32. The non-transitory computer readable storage medium of claim 24, having instructions that further configure the processor to, prior to determining the timing of each haptic feedback command within the haptically enabled message:
generate the haptically enabled message by receiving a gesture from a user of the device and converting the gesture into at least one haptic feedback command in the haptically enabled message.

33. The method of claim 1, further comprising:
receiving a message, the message comprising text; and
inserting the plurality of haptic feedback commands in the message to produce the haptically enabled message;
wherein the receiving and the inserting are performed prior to the accessing of the haptically enabled message.

34. The mobile terminal device of claim 13, wherein the processor is further configured to:
receive a message, the message comprising text; and
insert the plurality of haptic feedback commands in the message to produce the haptically enabled message;
wherein the processor is configured to receive the message and insert the plurality of haptic effects prior to accessing the haptically enabled message.

35. The non-transitory computer readable medium of claim 24, having further instructions stored thereon that, when executed by the processor, cause the processor to:
receive a message, the message comprising text; and
insert the plurality of haptic feedback commands in the message to produce the haptically enabled message;
wherein the execution of the instructions by the processor cause the processor to receive the message and insert the plurality of haptic feedback commands prior to determining the timing of each haptic feedback command within the haptically enabled message.

* * * * *

UNITED STATES PATENT AND TRADEMARK OFFICE
CERTIFICATE OF CORRECTION

| | |
|---|---|
| PATENT NO. | : 8,315,652 B2 |
| APPLICATION NO. | : 11/750694 |
| DATED | : November 20, 2012 |
| INVENTOR(S) | : Danny A. Grant et al. |

It is certified that error appears in the above-identified patent and that said Letters Patent is hereby corrected as shown below:

Column 2, Line 9, Please delete "(^ ^)", please insert --(^_^)--.

Column 3, Line 59, Please delete "(^ ^)", please insert --(^_^)--.

Signed and Sealed this
Nineteenth Day of March, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,315,652 B2 | Page 1 of 1 |
| APPLICATION NO. | : 11/750694 | |
| DATED | : November 20, 2012 | |
| INVENTOR(S) | : Grant et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 525 days.

Signed and Sealed this
Thirtieth Day of December, 2014

Michelle K. Lee
*Deputy Director of the United States Patent and Trademark Office*